Aug. 11, 1959     R. W. CAPRON     2,899,653

TRANSDUCER

Filed July 3, 1956

*INVENTOR.*
ROBERT W. CAPRON
BY
*Allen M Krass*
AGENT

United States Patent Office 2,899,653
Patented Aug. 11, 1959

2,899,653
TRANSDUCER

Robert W. Capron, Detroit, Mich., assignor to Bendix Aviation Corporation, Detroit, Mich., a corporation of Delaware Application July 3, 1956, Serial No. 595,778
3 Claims. (Cl. 336—30)

This invention relates to transducers for producing electrical signals which are proportional to a mechanical movement. More particularly, it pertains to a tracing stylus for a machine tool position control system.

When it is desired to produce a group of similar workpieces with a machine tool, it often becomes economical to provide an automatic tool position control system for the machine which operates from a template that represents a cross section of an ideal finished workpiece. A tracer stylus is moved along the template and it controls the position of the machine's cutting tool in accordance with the shape of the template. The present invention provides a novel tracing stylus to be used with systems of this type.

The tracing styli known to the prior art may be divided into two general types: those that provide a single signal which is proportional to the deflection of the stylus tip; and those that provide two signals which are proportional to the rectangular coordinates of the deflection of the stylus tip. The present device falls into the former class. It provides a signal which is proportional to the magnitude of the deflection of the tracer stylus but which is independent of the direction of that deflection.

If the machine tool which uses a tracer system is to operate within close tolerances, the signal to noise ratio of the stylus must be high since any noise output of the stylus may be translated into a dimension which represents the limit of accuracy of the device. In addition, since any amplification of the stylus signal prior to its introduction to the control system lowers the signal to noise ratio it is desirable that the sensitivity of the transducer unit be as high as possible. That is, a small deflection of the stylus tip must produce a large output signal. For the same reason, it is desirable that the stylus output should be of such a nature as not to be influenced by variations in the ambient atmospheric conditions. The stylus should also be so constructed that it will not be damaged by excessive pressure being applied to the tip as a result of misoperation of the position control system.

The present invention provides the above features in a unit that is relatively simple in construction so as to be susceptible to economic manufacture and ease of maintenance. In essence, it comprises an electric coil which is energized so as to provide flux through an iron circuit which includes an air gap. One edge of the iron circuit which borders on the air gap is substantially circular in cross section and means are provided to vary the dimensions of the air gap in accordance with variations in deflections of the stylus. Since the air gap is symmetrical, equal variations in deflection in different directions produce equal signal outputs from the stylus. These variations in the air gap that result from deflections of the stylus tip vary the inductance of the coil. The coil is connected in a bridge circuit with a second adjustable inductance coil that is contained in the same housing so as to undergo the same variations as the result of changes in atmospheric conditions.

It is, therefore, an object of the present invention to provide a transducer which will produce an electrical output signal that is proportional to the magnitude but not the direction of the deflection of its tip.

Another object of the invention is to provide a stylus which will generate a relatively high output signal for a relatively small deflection.

A further object of the present invention is to provide a tracing stylus which has a very high resolution.

Another object of the present invention is to provide a tracer stylus that may be so connected that it will not be affected by variations in atmospheric conditions.

A still further object is to provide a tracer stylus that will not be damaged as a result of the position system malfunctioning.

Other applications, objects and advantages of the present invention will be made apparent by the following detailed description of an embodiment of the invention. The description makes reference to the accompanying drawings in which:

Figure 1 comprises an elevation sectional view of the stylus taken along lines 1—1 of Figure 2;

Figure 1:
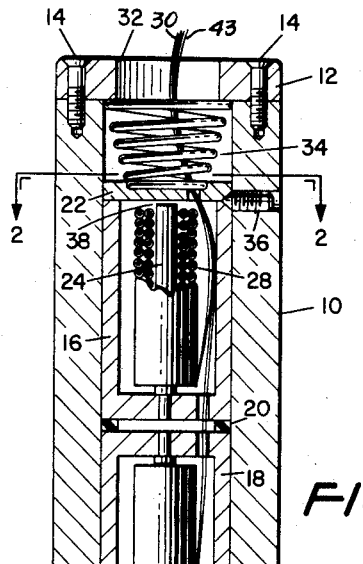
Figure 2:
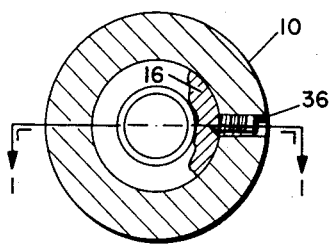
Figure 2 is a plan section of the stylus taken along lines 2—2 of Figure 1.
Figure 4:
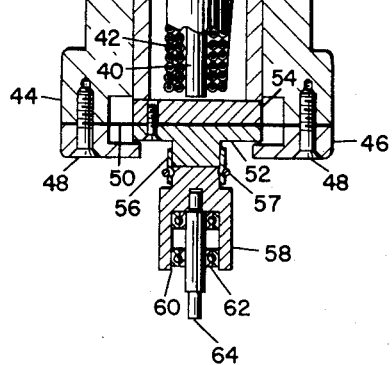
Fig. 4 is an enlarged view of the releasable coupling.
Figure 4:
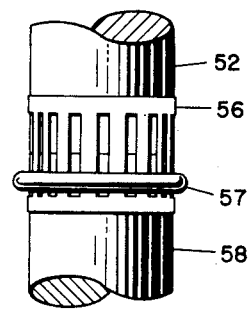

The stylus is contained in a cylindrical aluminum housing 10 that is closed at its upper end by an end plate 12 that is fastened to it by two screws 14. Two steel cores 16 and 18 are press fitted into the inner diameter of the housing 10. The cores 16 and 18 are separated by a washer 20. The core 16 is closed at its upper end by a cover plate 22. A central shaft 24 extends through the central axis of the core 16 and is pressed in the bottom plate of the core. An electric coil 28 is wound over the shaft 24 and its leads 30 are carried to the external circuitry through a hole 32 in the end plate 12. The cover plate 22 is pressed against the open end of the core 16 by a spring 34 that works against the end plate 12.

A screw 36 which has a pointed end is fixed in a threaded hole in the side of the housing 10 and presses against the cover plate 22 and the core 16. When the screw 36 is turned so as to move it inwardly it raises one edge of the cover plate 22 off of the core 16. Since the flux which is generated by the coil 28 must pass through a path which includes the air gap 38 between the cover plate 28 and the shaft 24, the inductance of the coil 22 may be varied by adjusting the position of the screw 36.

The core 18 is similar in shape to the core 16 but is pressed in the housing 10 in an inverted position with its open end downward. A central shaft 40 is fastened in the upper end of the core 18 and a coil 42 is wound around the shaft 40 with its leads 43 passing to the external circuitry through the hole 32.

The lower end of the housing 10 is flanged at 44 and a circular cover 46 is screwed to this flange with fasteners 48. A thin spring steel diaphragm 50 is supported across the lower end of the housing 10 between the cover 46 and the housing 10. A flanged member 52 is fixed to the lower side of the diaphragm 50 and an armature 54 is fixed to its top side. The armature 54 is circular in shape and acts to close the magnetic circuit followed by the flux which is generated by the coil 42. A longitudinally slotted cylindrical spring steel neck 56 is fixed to the flanged member 52 as by brazing and a ring 57 at the lower end of the neck 56 is pressed into a groove in the stylus tip housing 58, thereby supporting the housing 58 on the flanged member 52 in a removable manner. An internal bore 60 on the tip housing 58 supports two ball bearings 62 which journal a rotatable tip 64.

When excessive pressure is communicated to the tip 64, as upon the malfunctioning of the position control system, the ring 56 allows the tip housing 58 to come apart from the flanged member 52 without harming the delicate stylus mechanism. This occurs after the member 52 has hit against the cover 46, which acts as a stop.

In normal operation pressures against the tip 64 are communicated through the member 52 to the diaphragm 50 causing it to tip. The circular armature 54 therefore leaves contact with a section of the bottom of the core 18 at its periphery. The gap between the armature 54 and the core 18 is dependent upon the amount of pressure on the tip 64. Thus, deflections of the tip 64 vary the reluctance of the path which the flux generated by the coil 42 must pass through and the inductance of the coil varies. Because of the symmetry that exists between the armature 54 and the end of the core 18, the variation in the inductance of the coil 42 is completely independent of the direction of the deflection of the tip 64.

Because of the ball bearing 62 mount of the tip 64, no appreciable frictional drag is transmitted from the template being traced to the tip housing 58 but rather the tip 64 rolls freely and the pressure on the tip 64 is in a direction normal to the contour of the template.

Figure 3:
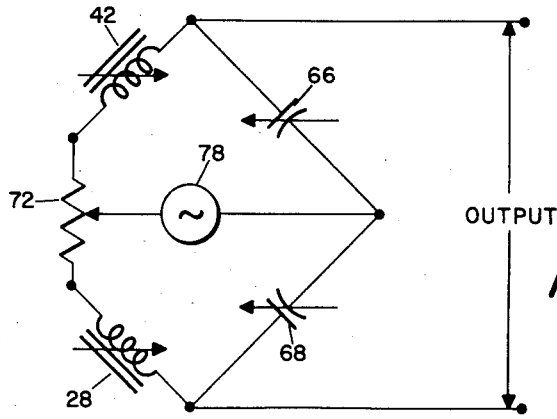
Figure 3 is a schematic view of an output circuit for the stylus.

The coil leads that are brought up to the hole 32 are connected to the external circuit in a manner shown in Figure 3. Each coil is placed in series with a variable capacitor 66 and 68. The other ends of each coil 28 and 42 are connected to the fixed contacts of a potentiometer 72. The variable contact of the potentiometer 72 and the other ends of the capacitors 66 and 68 are connected to a 60 cycle voltage source 78. The midpoint of each coil capacitor leg is connected to the external position control circuit (not shown).

In order to place the circuit in operation the tip 64 is first deflected to a null position at which it is desired to obtain a zero control signal. The variable capacitor 66 which is in series with the coil 42 is then adjusted until that half circuit is in resonance. To balance the bridge the other variable capacitor 68 is adjusted to the same value as the capacitor 66 and the adjustment screw 36 is used to bring the bridge output to as near a null value as is possible. Next, the variable resistance 72 is adjusted so as to balance the resistances in each leg and produce a better null. These adjustments are alternated until the best null is obtained.

As long as both legs of the bridge are in resonance the output remains at this null. However, when the leg containing the coil 42 is shifted out of resonance as a result of variations in the inductance of the coil 42 that are caused by deflections in the stylus tip 64, the output voltage of the bridge is no longer a null value but rather increases sharply as the resonance point is departed from. The phase of the output signal of the bridge is dependent on the direction of the tip deflection from its null position.

Because both legs of the bridge are producing nearly pure sinusoidal voltages of the same magnitude at a null position, there is a very low noise output from the bridge that results from the generation of harmonics from the bridge. Therefore, a very high signal to noise output is obtained at any deflection of the stylus tip 64.

It is thus seen that the present invention represents a stylus that may be used to produce a voltage that is proportional to the magnitude of the tip deflection but independent of the direction of that deflection. It is simple in construction and has properties that produce high accuracy in the control circuit.

Having thus described my invention, I claim:

1. A motion transducer for producing a signal having an amplitude proportional to the amount of deflection of a stylus along a single coordinate in either direction from a null position, including, a housing, a first coil in the housing, a cylindrical member forming a partial flux path for the coil, a circular armature for completing the flux path upon cooperation with the cylindrical member, a spring supported by the housing and attached to the armature for maintaining the armature in contact with the cylindrical member, an annular member secured to the spring and the armature in aligned relationship with the armature, means on the housing to limit the movement of the annular member, a stylus housing mounted on the annular member in detachable relationship to disengage the housing from the member upon a predetermined relative movement between them, and a stylus in the stylus housing for being deflected and for producing a corresponding deflection of the stylus housing, the annular member, and the spring to displace the armature from the cylindrical member a corresponding amount and to produce a proportionate change in the reluctance of the flux path, the stylus housing being disengaged from the annular member upon a stylus deflection sufficient to cause the annular member movement to be limited and to produce the predetermined relative movement between the stylus housing and the annular member.

2. A motion transducer for producing a signal having an amplitude proportional to the amount of deflection of a stylus along a single coordinate in either direction from a null position, including, a housing, a first coil in the housing, a cylindrical member forming a partial flux path for the coil, a circular armature for completing the flux path upon cooperation with the cylindrical member, a spring supported by the housing and attached to the armature for maintaining the armature in contact with the cylindrical member, means for flexing the spring an amount proportional to the stylus deflection to displace the armature from the cylindrical member a corresponding amount and to produce a proportionate change in the reluctance of the flux path, a second coil in the housing, a flux path for the second coil including an air gap, and means for adjusting the width of the air gap to fix the reluctance of the flux path at a value to provide the second coil with the same inductance maintained by the first coil in the null position of the stylus.

3. A motion transducer for producing a signal having an amplitude proportional to the amount of deflection of a stylus along a single coordinate in either direction from a null position, including, a housing, a first coil in the housing, a cylindrical member forming a partial flux path for the coil, a circular armature for completing the flux path upon cooperation with the cylindrical member, a spring supported by the housing and attached to the armature for maintaining the armature in contact with the cylindrical member, an annular member secured to the spring and the armature in aligned relationship with the armature, means on the housing to limit the movement of the annular member, a stylus housing mounted on the annular member in detachable relationship to disengage the housing from the member upon a predetermined relative movement between them, a stylus in the stylus housing for being deflected and for producing a corresponding deflection of the stylus housing, the annular member, and the spring to displace the armature from the cylindrical member a corresponding amount and to produce a proportionate change in the reluctance of the flux path, the stylus housing being disengaged from the annular member upon a stylus deflection sufficient to cause the annular member movement to be limited and to produce the predetermined relative movement between the stylus housing and the annular member, a second coil in the housing, a flux path for the second coil, and means for adjusting the reluctance of the flux path to fix the reluctance at a value to provide the second coil with the same inductance maintained by the first coil in the null position of the stylus.

References Cited in the file of this patent

UNITED STATES PATENTS

| 2,470,244 | Frylund | May 17, 1949 |
| 2,510,073 | Clark | June 6, 1950 |
| 2,636,386 | Schultheis | Apr. 28, 1953 |
| 2,675,525 | Wiancko | Apr. 13, 1954 |